United States Patent [19]

Wild

[11] 3,835,129
[45] Sept. 10, 1974

[54] CEPHALOSPORIN C RECOVERY
[75] Inventor: Gene M. Wild, Indianapolis, Ind.
[73] Assignee: Eli Lilly and Company, Indianapolis, Ind.
[22] Filed: Nov. 15, 1971
[21] Appl. No.: 198,986

[52] U.S. Cl. ............................. 260/243 C, 424/246
[51] Int. Cl. .............................................. C07d 99/24
[58] Field of Search ..................... 260/239.1, 243 C

[56] References Cited
OTHER PUBLICATIONS
W. V. Daehne, et al., J. of Medicinal Chem., Vol. 13, No. 4, pp. 607–612, (1970).

Primary Examiner—Donald G. Daus
Assistant Examiner—Jose Tovar
Attorney, Agent, or Firm—William B. Scanlon; Everet F. Smith

[57] ABSTRACT

Cephalosporin C is recovered directly from aqueous media by reacting Cephalosporin C therein with certain alkanoic acid anhydrides, e.g., a haloalkanoic acid anhydride or mixed haloalkanoic-alkanoic acid anhydride, at pH 7 to 11, at 0° to 30°C., treating the acylated mixture with quinoline, lowering the pH, stirring, and separating the N-acylated Cephalosporin C quinoline salt hydrate from the aqueous medium.

7 Claims, No Drawings

CEPHALOSPORIN C RECOVERY

INTRODUCTION

This invention relates to processes for extracting Cephalosporin C from the aqueous fermentation liquors in which it was produced. More particularly, this invention provides an improved, simplified process for extracting Cephalosporin C from various aqueous media.

BACKGROUND OF THE INVENTION a. General Cephalosporin History

Cephalosporin C, obtained by fermentation, has been defined as having the following structure:

I
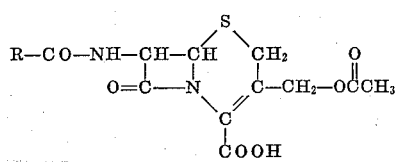

where R is $HOOC-CH(NH_2)-(CH_2)_3-$. It is also known as 7-(5′ aminoadipamido)-cephalosporanic acid. It has weak antibiotic activity, but it is important as a source of Cephalosporin C nucleus, that is, 7-aminocephalosporanic acid (7-ACA), having structure formula II
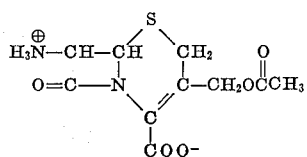

shown here in zwitterionic form, although anionic and cationic salts may be formed and used. Antibiotics, such as cephalothin and cephaloridine are prepared from 7-ACA by known methods. Various derivatives of 7-ACA based antibiotics are made by acylating the 7-amino group of 7-ACA with appropriate acyl acids, halides, or other reactive forms of such acyl groups and/or by replacing the acetoxy group attached to the 3-methyl carbon atom with appropriate nucleophilic groups now well documented in the literature. Thus it can be seen that Cephalosporin C is a very valuable fermentation derived antibiotic which is of a special interest as a source of starting material for producing numerous other more potent antibiotics. This invention is concerned with methods for extracting the Cephalosporin C values from the aqueous fermentation liquors in which it was produced as well as from partially purified fermentation broths and "resin eluates" containing Cephalosporin C, before any cleavage reaction to remove the 7-aminoadipoyl groups is begun.

The term "Cephalosporin C values" is used herein to mean Cephalosporin C and Cephalosporin C-like compounds such as desacetyl Cephalosporin C which are produced in the fermentation.

U.S. Pat. No. 3,160,631 describes the treatment of sodium Cephalosporin C, dissolved in water, with sodium bicarbonate and with acetone cooled to 0°C. This was followed by treatment of the mixture with benzoyl chloride in acetone. The reaction mixture was extracted with chloroform, acidified, and N-acylated Cephalosporin C was then extracted with methyl isobutyl ketone. The N-acyl dialkyl Cephalosporin C esters of that patent are recovered by a process involving the extensive use of organic solvent procedures.

U.S. Pat. No. 3,234,223 describes the use of a 2,4-dinitrophenyl amino protecting group on Cephalosporin C during cleavage of the Cephalosporin C to obtain 7-amino-cephalosporanic acid but this patent does not say how the 2,4-dinitrophenyl Cephalosporin C starting material was obtained.

U.S. Pat. No. 3,467,654, describes the use of acetone in the Cephalosporin C initial broth filtrate to precipitate impurities therefrom, adsorbing the Cephalosporin C from the purified filtrate on an anion exchange resin, eluting the Cephalosporin C from the resin with an acid buffer.

Thus, prior art processes for extracting Cephalosporin C or its derivatives from fermentation liquors have involved the use of organic solvent extraction steps. Such operations give rise to emulsion and solvent recovery problems. In some cases it was considered advantageous to use mixed organic solvents such as ethyl acetate and ethanol or isopropanol. Cyclohexanone was considered a good N-acyl Cephalosporin C extraction solvent but it presented emulsion problems when used in large scale operations.

SUMMARY OF THE INVENTION

Briefly, this invention provides a process for extracting N-acylated Cephalosporin C quinoline salts directly from aqueous media in which the Cephalosporin C derivative was prepared. According to this process, an aqueous solution of Cephalosporin C or a salt thereof is acylated with certain acid anhydrides at pH 7 to 11, at 0° to 30°C., the N-acylated Cephalosporin C reaction mixture is treated with quinoline, isoquinoline or other equivalent base, the pH is lowered to 2.0 to 3.5, the mixture is maintained, preferably with stirring, at mildly cooled conditions while an optimum amount of crystallization occurs, and then the hydrated N-acylated Cephalosporin C quinoline salt crystals are recovered from the aqueous medium.

DETAILED DESCRIPTION OF THE INVENTION

According to this invention, there is provided an improved, simplified process for extracting Cephalosporin C from aqueous media containing it, prior to the subjecting of the Cephalosporin C derivatives to cleavage operations to obtain 7-aminocephalosporanic acid therefrom. In this process the aqueous Cephalosporin C containing medium is mixed with an acid anhydride of the formula III
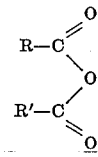

wherein R is a $C_2$ to $C_5$-alkyl group or a $C_1$ to $C_5$-haloalkyl group and R′ is a $C_1$ to $C_5$-alkyl group or a $C_1$ to $C_5$-haloalkyl group with the halogen in the haloalkyl groups being chlorine or bromine, at a temperature of from about 0°C. to about 30°C., at a pH of from about 7 to about 11 to form the N-acyl Cephalosporin C (step a). The N-acyl group is derived from the acid anhydride. In step *b* quinoline or isoquinoline or equivalent base is added to the mixture from step *a* in molar excess relative to the N-acyl Cephalosporin C. After the reaction mixture is thoroughly mixed, the pH is lowered to from 2.0 to 3.5 with an acidifying agent (step *c*). The mixture from the acidifying step is maintained at 0°–30°C., with crystallization generally occurring in 1 hour or less (step *d*). Thereafter, the N-acyl Cephalosporin C quinoline salt crystallizes from the aqueous medium, usually as the monohydrate and is recovered from such aqueous medium (step *e*).

The aqueous Cephalosporin C containing medium can be fermentation broth which may have been subjected to pH adjustment and the addition of one or more filter aids and filtered to obtain a filtered fermentation broth therefrom. This is referred to herein as untreated broth. The aqueous Cephalosporin C containing medium can also be a concentrated, methanol-treated fermentation broth containing Cephalosporin C. This aqueous medium is herein referred to as partially treated broth. The aqueous Cephalosporin C containing medium may also result from a Cephalosporin C solution which has been treated by one or more resin columns to further purify the solution of Cephalosporin C. This latter aqueous medium if referred to as Cephalosporin C "resin eluate." The source and purity of the aqueous Cephalosporin C containing medium has some effect on the amount of the alkanoic acid anhydride which is used to acylate the amino groups of the Cephalosporin C therein. When the acylation is conducted with untreated broth, typically 8 to 9 moles of acid anhydride are used per mole of Cephalosporin C. With concentrated partially treated broth, typically 4 to 6 moles of acid anhydride are used per mole of Cephalosporin C. With "resin eluate" Cephalosporin C solutions from 1.5 to 3.0 moles of acid anhydride, per mole of Cephalosporin C are found to give optimum acylation results.

Examples of acid anhydrides which can be used in the process include propionic, butanoic, pentanoic and hexanoic anhydrides, mixed alkanoic haloalkanoic anhydrides such as chloroacetic propionic anhydride, chloroacetic acetic anhydride, bromoacetic propionic anhydride as well as bis haloalkanoic anhydride such as chloroacetic anhydride, dichloroacetic anhydride, bromoacetic anhydride, chloropropionic anhydride, chlorobutanoic anhydride, and the like.

The first step of the process of this invention, that is, the acylation step is conducted at a pH of between about 7 and 11, preferably at a pH of about 8.5–9.5. The pH may be maintained by close monitoring of the reaction and the addition of base as the pH tends to drop due to the formation of acid during the acylation reaction. Alternatively, the pH may be maintained by the use of suitable buffers such as sodium borate or boric acid with additional sodium hydroxide. Other buffering agents which may be used include a carbonate/bicarbonate buffering system made from the sodium or potassium salts thereof or phosphate buffers. The acylation may be conducted at any temperature between the freezing point of the mixture and about 30°C. We prefer to maintain the temperature of the mixture between 10° and 20°C., more preferably between about 15° and 20°C. This temperature may be maintained with suitable cooling as needed.

When the acylation step is completed, the reaction mixture is treated with quinoline, isoquinoline, or equivalent base in molar excess relative to the Cephalosporin C content in the aqueous mixture. Generally, from 1.5 to about 12 moles of quinoline per mole of N-acyl Cephalosporin C can be used. We prefer to use at least 2 moles of quinoline per mole of Cephalosporin C although higher quantities of quinoline may be used. Typically, a mole ratio of from 2 to 4 moles of quinoline per mole of Cephalosporin C is sufficient to effect complete reaction of the N-acylated Cephalosporin C.

When the quinoline addition to the aqueous Cephalosporin C reaction mixture has been completed, the pH of the mixture is lowered to 2.0 to 3.5 with an acidifying agent, which can be any appropriate acid such as sulfuric acid or hydrochloric acid. We prefer to use sulfuric acid for reasons of economy. At these pH conditions, the mixture is then maintained preferably with stirring at 0°–30°C., usually 10° to 20°C. for 1 hour, more or less, usually about 20 minutes, while crystallization occurs. When crystallization appears to be complete, the N-acyl Cephalosporin C quinoline salt can be recovered from the aqueous reaction mixture by conventional means such as by centrifugation or filtration, washed with water and then with an organic solvent such as ethyl acetate and then dried by appropriate means such as in a fluid bed for about 2 hours at 60°C. to about 3 percent water (as measured by the Karl Fischer method).

By this above described process, I have found that organic solvent extraction steps can be eliminated. The emulsion and solvent recovery problems which are associated with the use of organic solvents can thus be avoided. The process is shorter and requires less equipment. The quality of the products obtainable by this method compares favorably with prior art products (N-acylated Cephalosporin C) and the yields of product are improved extraction processes.

In the beginning of this process it is preferred to use an aqueous Cephalosporin C containing liquor having a potency of 30,000 to 50,000 micrograms/ml. (by the nicotinamide assay method) (30 to 50 mg./ml.) or 40,000 to 60,000 micrograms/ml. (by the UV assay method) (40 to 60 mg./ml.) Higher potencies than this in the starting aqueous liquors give N-acyl Cephalosporin C quinoline salt crystal slurries which may be too thick to handle properly. Lower potencies than this may lead to slow crystallizations, and also sodium sulfate in the product if dilution of the mixture by resin elution buffers is the cause of the low potency. Proper concentration or dilution of the solution, before or after acylation, may be done. The most desirable Cephalosporin C potency aqueous liquor appears to be 40,000 to 45,000 micrograms/mg. (by the nicotinamide method) or 50,000 to 55,000 micrograms/mg. of Cephalosporin C (by the UV assay method).

The base used in the acylation step to maintain pH is preferably sodium hydroxide buffered with borax. A typical ratio is sodium hydroxide-4.5 moles, sodium tetraborate-3 moles. Sodium hydroxide concentrations up to 8 molar (25 percent) are satisfactory and a borax concentration of 1 molar is generally adequate. An acylation pH of about 9 appears to be near the optimum. A pH of 7.5 or 10.5 gives somewhat lower yields.

A reaction temperature for the acylation which does not exceed 20°C. appears to be most acceptable. Temperatures above 25°C. and below 15°C. are less preferred. The acylation reaction is completed in 2 to 2.5 minutes. However, an average reaction time of 10 to 15 minutes is generally used to insure completion of reaction.

In some cases, it may be desirable to store the N-acylated Cephalosporin C reaction mixture because of crystallization scheduling and other production problems. In such event, for maximum stability, the pH of the mixture is preferably adjusted pH 5.0 to 5.5 with 30 percent sulfuric acid and cooled to 10° to 15°C. during storage.

The N-acylated Cephalosporin C quinoline salt forms in good yield with from 2 to 6 moles of quinoline per mole of Cephalosporin C as determined by the U.V. method. Quinoline at 2.5 moles per mole of Cephalosporin C should insure that at least 2 moles is present in the face of maximum Cephalosporin C assay variation.

The crystalline N-acyl Cephalosporin C quinoline salt is preferably washed with water to remove impurities, most of which are water soluble: borates, sulfates, anhydride hydrolysis products, excess quinoline, and soluble impurities. After the water wash, the crystalline salt is preferably washed with ethyl acetate to remove organic soluble impurities and to partially displace water from the filter cake. This results in a more easily dried cake. Water miscible solvents (alcohols, acetone, acetonitrile) are unacceptable as wash, for their aqueous solutions partially dissolve the product and cause yield loss as well as poor filter cake handling.

The cake of N-acyl Cephalosporin C quinoline salt can be dried by conventional methods. We prefer to dry in a fluid bed dryer for 1.5 to 3 hours at about 60°C. to a water content of 3.5 percent or less, as determined by the Karl Fischer method.

The invention is further illustrated by the following detailed examples, which are not intended to be limiting.

Example 1

This example illustrates the preparation of Cephalosporin C quinoline salt by the prior art solvent extraction process.

A 500 ml. portion of an aqueous Cepahosporin C "resin eluate" (containing 45.27 mg. of Cephalosporin C per milliter), is treated with 8.2 g. of boric acid. The temperature of the mixture is lowered to 10°C. in an ice bath and the pH of the mixture is adjusted to 9.0 with 25 percent sodium hydroxide (44 ml.). To this mixture there is added 55 ml. of chloroacetic propionic anhydride solution in ethyl acetate (2 equivalents of anhydride based on Cephalosporin C). The pH of the mixture is maintained between 9.0 and 9.5 during the acylation. At the end of the acylation, the mixture is extracted with a mixture of 500 ml. of ethyl acetate and 68 ml. of ethanol. The pH of the extraction mixture is adjusted to 1.5 with 30 percent sulfuric acid (80 ml.). A moderate emulsion occurred. This emulsion was separated into organic and aqueous layers to give 575 ml. of an organic extract. This organic layer contained 35.7 mg. of N-acylated Cephalosporin C per milliter by ultraviolet assay. To this organic extract, there is added 34.5 ml. of quinoline, the mixture is stirred for 20 minutes, chilled and filtered. The N-acylated Cephalosporin C quinoline salt is washed with ethyl acetate and dried in vacuo at 40°C. overnight. The yield is 28.7 g. of N-acylated Cephalosporin C quinoline salt. It was 89 percent pure by UV analysis. The yield was 73.4 percent from the "resin eluate."

The acylating mixture was made by reacting sodium propionate and chloroacetyl chloride in ethyl acetate. The resulting anhydride solution mixture was used, as is, as the acylating agent.

Example 2

This example illustrates and compares the method of this invention with the prior art method of Example 1. A 500 ml. portion of aqueous Cephalosporin C "resin eluate" containing 33.0 mg. of Cephalosporin C per milliter is acylated by adding 42 ml. of chloroacetic propionic anhydride solution, prepared as described in Example 1 (2 equivalents of an anhydride based on Cephalosporin C). The pH of the mixture is maintained at 9.0 by adding sodium borate buffer (60 ml.). After acylation is completed, 26.2 ml. of quinoline is added and the pH is lowered to 3.3 with 61 ml. of 30 percent sulfuric acid. The mixture is stirred for 2 hours to insure complete reaction, chilled to about 15°C. and filtered. The N-acylated Cephalosporin C quinoline salt crystalline product is washed with water, and dried overnight in vacuo at 40°C. The yield is 22.5 g. It had a purity of 97.1 percent. This represents a yield of 86 percent from "resin eluate."

Example 3

This example illustrates that the aqueous crystallization procedure of this invention also provides an advantageous method for preparing the N-acylated Cephalosporin C quinoline salt from filtered broth.

A portion of filtrate obtained from a Cephalosporin C fermentation whole broth treated with 13 g. of aluminum sulfate octadecahydrate and 10 ml. of 6.6 percent polyethyleneimine per liter of broth and containing 25.8 g. of Cephalosporin C was treated with 2 volumes of methanol per volume of filtrate.

The precipitate was filtered out and discarded. The filtrate was concentrated to 530 ml. volume. The concentrated filtrate was chilled to 10°C. and acylated with 105 ml. of chloroacetic propionic anhydride solution (an estimated 5 equivalents of anhydride/per equivalent of Cephalosporin C). The pH of the mixture was maintained at 9.0 with 145 ml. of borate buffer. After acylation was completed, 39 ml. of quinoline was added. The pH was adjusted to 2.9 with 105 ml. of 30 percent sulfuric acid. The acidified mixture was stirred for 30 minutes while crystallization of the N-acyl Cephalosporin C quinoline salt occurred. The mixture was chilled to about 15°C., filtered and washed with water. Upon drying overnight in vacuo at 40°C. there was obtained 32.5 g. of crystalline. N-acyl Cephalosporin C quinoline salt, product. With a purity of 95.4 percent by the UV analysis, the yield was 81.5 percent from filtered broth.

Example 4

To a solution of 21.0 g. of boric acid in 2,000 ml. of a solution of sodium Cephalosporin C mixed with sodium acetate containing 40.4 mg. per ml. of Cephalosporin C, termed "resin eluate" aqueous solution buffered with sodium borate there was added over 10 minutes a solution of 50.6 g. of propionic anhydride in 150 ml. of ethyl acetate to block the amino nitrogen. The temperature was maintained at 15 to 20°C. with a water bath and the pH maintained at 8.5 to 9.0 with 25 percent sodium hydroxide solution. When the pH remained constant (approximately 3 minutes after completion of the anhydride addition), the pH was lowered to 2.5 with 30 percent w/w sulfuric acid and then 75 g. of a filter aid (Celite 545) was added. The mixture was filtered and to the filtrate was added 91.5 ml. of quinoline. The pH was readjusted to 3.5 with sulfuric acid and the solution stirred 30 minutes at room temperature. The mixture was refrigerated overnight (5°C.). The N-propionyl Cephalosporin C quinoline salt precipitate which formed was filtered, washed with water, and dried under vacuum at 40°C. It weighed 81.2 g. (97.6 percent purity) resulting in a yield of 84.6 percent from resin eluate.

I claim:

1. A process for recovering Cephalosporin C from an aqueous medium which comprises
   a. mixing the aqueous Cephalosporin C containing liquid with an acid anhydride of the formula

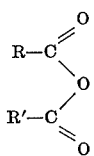

wherein R is a $C_2$ to $C_5$-alkyl group or a $C_1$-$C_5$-mono-or di-haloalkyl group and R' is a $C_1$ to $C_5$-alkyl group, or a $C_1$-$C_5$-mono-or di-haloalkyl group with the halogen in the haloalkyl groups being chlorine or bromine, at a temperature of from about 0°C. to about 30°C., at a pH of from about 7 to about 11 to form N-acyl Cephalosporin C, wherein the N-acyl group is derived from the acid anhydride;
   b. adding quinoline or isoquinoline base to the mixture from step (a) in molar excess relative to the N-acyl Cephalosporin C;
   c. lowering the pH of the mixture from step (b) to 2.0 to 3.5 with an acidifying agent;
   d. maintaining the mixture from step (c) at 0° to 30°C. while crystallization occurs;
   e. recovering the N-acyl Cephalosporin C quinoline salt crystals from the aqueous medium of step (d).

2. A process as defined in claim 1 wherein the Cephalosporin C aqueous medium has a Cephalosporin C concentration of from about 30 to about 50 mg. per ml. of aqueous mixture.

3. A process as defined in claim 1 wherein the Cephalosporin C aqueous medium is maintained at about 10° to 20°C. during the acylation reaction.

4. A process as defined in claim 1 wherein the Cephalosporin C aqueous medium has been treated with one or more ion exchange resins to partially purify the Cephalosporin C aqueous medium.

5. A process as defined in claim 1 wherein the Cephalosporin C aqueous medium is a partially concentrated methanol-treated Cephalosporin C fermentation broth.

6. A process as defined in claim 1 wherein the Cephalosporin C aqueous medium is untreated Cephalosporin C fermentation filtered broth.

7. A process as defined in claim 1 wherein in step (a) a resin eluate having a concentration of from about 30 to about 50 mg. of Cephalosporin C per ml. is reacted with from about 1.5 to about 3 equivalents of chloroacetic propionic anhydride per equivalent of Cephalosporin C at a pH of about 8.5 to 9.5 while maintaining the temperature at from about 15°C. to about 20°C; in step (b) the reaction product of step (a) is treated and reacted with from about 2 to 4 equivalents of quinoline per equivalent of N-acyl Cephalosporin C;
   in step (c) lowering the pH of the reaction mixture from step (b) with acid to from about 2.5 to 3.0;
   in step (d) maintaining the mixture from step (c) at about 14° to 16°C. for about 1 hour while crystallization occurs;
   and step (e) recovering the crystalline N-acyl Cephalosporin C quinoline salt monohydrate from the aqueous liquor from step (d).

* * * * *

PO-1050
(5/69)

UNITED STATES PATENT OFFICE
CERTIFICATE OF CORRECTION

Patent No. 3,835,129      Dated September 10, 1974

Inventor(s) Gene M. Wild

It is certified that error appears in the above-identified patent and that said Letters Patent are hereby corrected as shown below:

Column 3, line 25, "if" should read --is--.

Column 4, line 37, "are improved extraction processes." should read --are improved by this process relative to yields obtainable by organic solvent extraction processes.--.

Signed and sealed this 19th day of November 1974.

(SEAL)
Attest:

McCOY M. GIBSON JR.      C. MARSHALL DANN
Attesting Officer      Commissioner of Patents